US012041956B2

(12) United States Patent
Crescenzo

(10) Patent No.: US 12,041,956 B2
(45) Date of Patent: Jul. 23, 2024

(54) FRUIT CUTTING METHOD AND MULTI-LANE MACHINE

(71) Applicant: Biagio Crescenzo, Montecorvino Pugliano (IT)

(72) Inventor: Biagio Crescenzo, Montecorvino Pugliano (IT)

( * ) Notice: Subject to any disclaimer, the term of this patent is extended or adjusted under 35 U.S.C. 154(b) by 669 days.

(21) Appl. No.: 17/264,460

(22) PCT Filed: Jul. 30, 2019

(86) PCT No.: PCT/IB2019/056468
§ 371 (c)(1),
(2) Date: Jan. 29, 2021

(87) PCT Pub. No.: WO2020/026127
PCT Pub. Date: Feb. 6, 2020

(65) Prior Publication Data
US 2021/0315252 A1  Oct. 14, 2021

(30) Foreign Application Priority Data

Jul. 30, 2018 (IT) .................. 102018000007636

(51) Int. Cl.
*A23N 4/22* (2006.01)
*A23L 19/00* (2016.01)
*A23N 4/02* (2006.01)
*B26D 3/26* (2006.01)
(Continued)

(52) U.S. Cl.
CPC ................ *A23N 4/22* (2013.01); *A23L 19/03* (2016.08); *A23N 4/02* (2013.01); *B26D 3/26* (2013.01); *B26D 3/30* (2013.01); *B26D 9/00* (2013.01); *A23V 2002/00* (2013.01); *B26D 2210/02* (2013.01)

(58) Field of Classification Search
CPC .. A23N 4/22; A23N 4/02; A23L 19/03; B26D 3/26; B26D 9/00
See application file for complete search history.

(56) References Cited

U.S. PATENT DOCUMENTS

| 1,042,590 | A | * | 10/1912 | Nyswonger | ............. | A23N 4/04 |
| | | | | | | 99/563 |
| 2,403,516 | A | | 7/1946 | Gaddini | | |
| 2,924,259 | A | | 2/1960 | Magnuson | | |

(Continued)

*Primary Examiner* — Amber R Orlando
*Assistant Examiner* — Andrew E Merriam
(74) *Attorney, Agent, or Firm* — Browdy and Neimark, PLLC

(57) ABSTRACT

An avocado cutting method discloses feeding, orientation and traveling along multi-lanes of avocados (A), a pre-cutting stage to create an incision in the upper and lower portions of each avocado (A) while the avocado (A) is held with its axis stem-blossom vertically oriented, and a cutting stage for cutting each avocado (A) in the sides thereof in order to divide the avocado (A) into two halves with simultaneous hit on its pit. A multi-lane machine is also disclosed having a cutting section (54) with a plurality of pairs of separate cutting blades (55). The cutting section (54) has a plurality of plungers (56) in the form of rods, each plunger (56) being movable between the separate cutting blades (55) with respect to an upper head (43) to strike the pit (N) and move it inside the avocado (A) in order to detach it from the pulp (P).

1 Claim, 9 Drawing Sheets

(51) Int. Cl.
*B26D 3/30* (2006.01)
*B26D 9/00* (2006.01)

(56) References Cited

U.S. PATENT DOCUMENTS

| | | | |
|---|---|---|---|
| 3,317,027 A * | 5/1967 | Anderson | A23N 4/14 |
| | | | 198/786 |
| 3,695,322 A | 10/1972 | Anderson et al. | |
| 4,627,339 A | 12/1986 | Ushman | |
| 4,629,629 A | 12/1986 | David | |
| 4,766,990 A | 8/1988 | Colombo | |
| 2009/0056519 A1 | 3/2009 | Moore | |

* cited by examiner

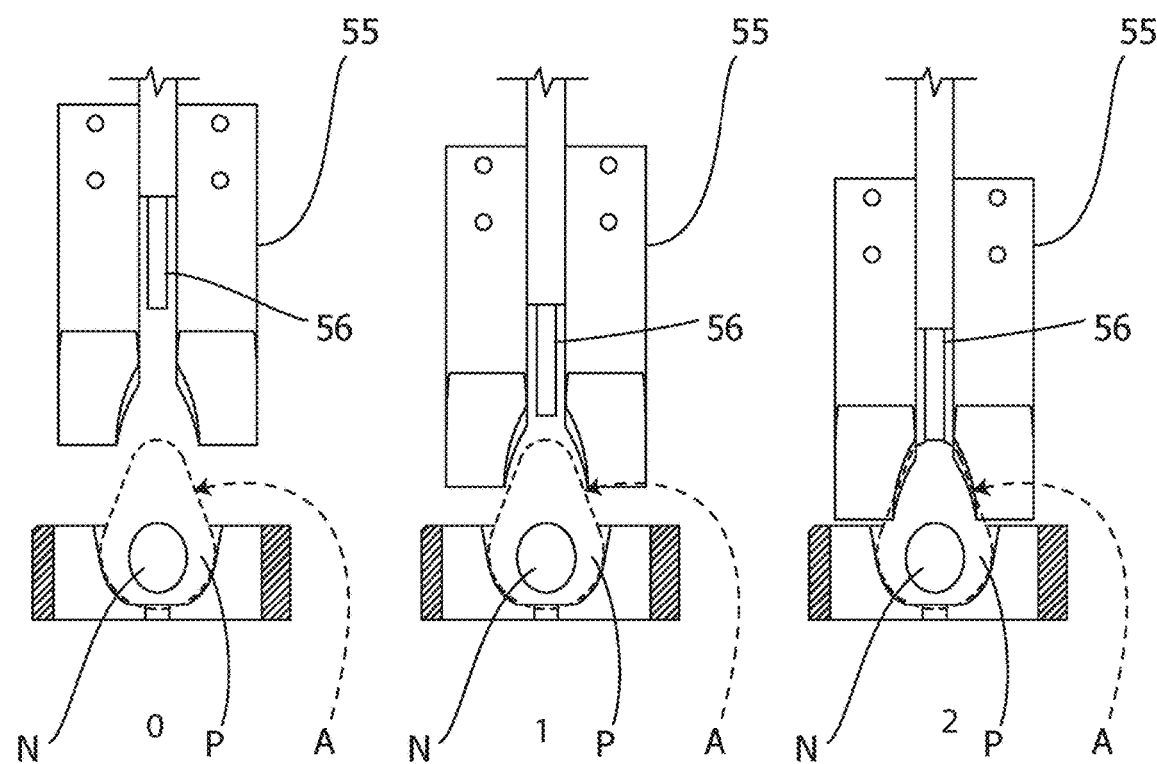
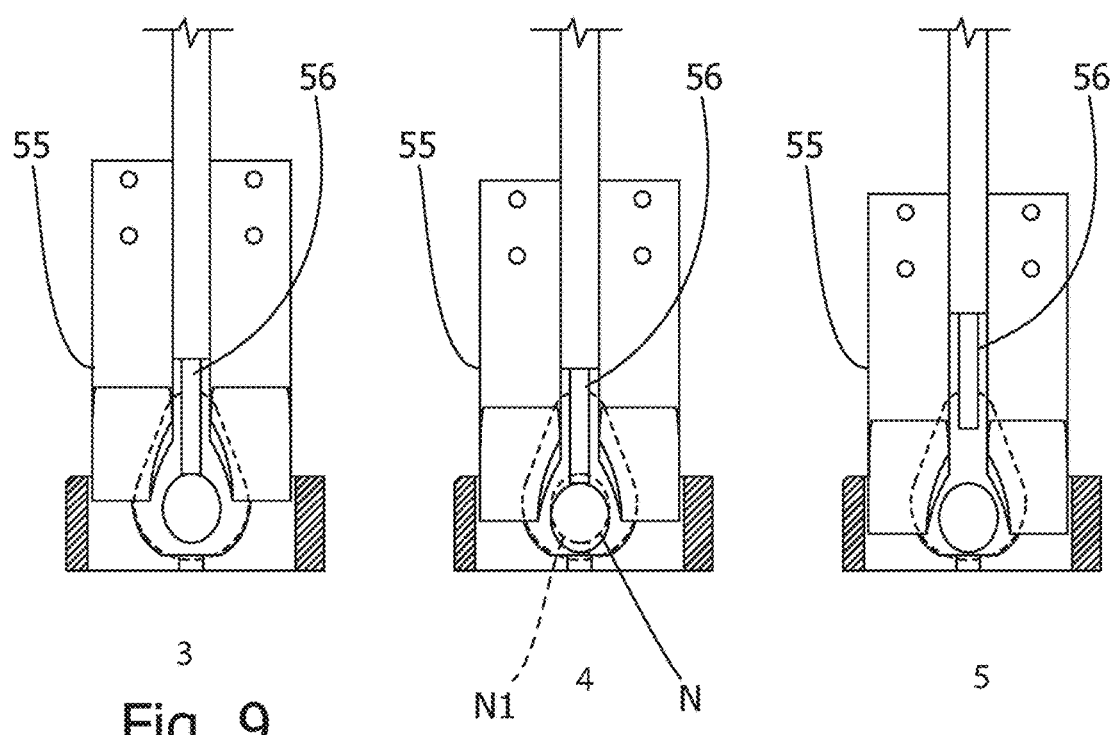
Fig. 9

FRUIT CUTTING METHOD AND MULTI-LANE MACHINE

TECHNICAL FIELD

The present invention relates to a fruit cutting method, in particular avocado. The invention also concerns a relevant multi-lane machine.

BACKGROUND ART

The avocado (*Persea americana*) is a pear-shaped drupe, 7 to 20 centimeters long, and weighs between 100 and 1000 g; it has a central seed, commonly called pit that is 3-5 cm in diameter. Its epicarp or peel can be green or aubergine, smooth or wrinkled, depending on the varieties and their origins.

The nature of the fruit, but above all its variations in size and weight, have so far required a manual processing thereof to separate the pit from the pulp which is certainly the most used part of the fruit.

It is understood that an industrial treatment that reduces use of manpower for the separation of the pit from the pulp would be very advantageous thanks to savings in processing costs.

U.S. Pat. No. 4,627,339 A describes an avocado cutting method, comprising feeding, orientation of a fruit, a cutting stage to create an incision in the upper and lower portions of the fruit, and also laterally to the pit in order to divide the fruit into two halves, while the fruit is held vertically oriented, and a splitting stage in which the pit is released by a wedging action from the pulp of the avocado. Each fruit is individually cut.

U.S. Pat. No. 3,695,322 A discloses a multi-lane machine comprising:
- a shuffle feeder,
- a longitudinal frame,
- a conveyor having fruit holding flights that advance along the longitudinal frame and are shaped with a number of recesses spaced transversely and sized according to the size of the fruits to be transported, each recess being provided at the bottom with an opening,
- upper and lower transversal heads, movable vertically with respect to the fruit holding flights, on vertical guides perpendicular to the longitudinal frame above the conveyor in one end thereof opposite to the shuffle feeder;
- a pre-cutting and cutting station, comprising:
  - a pre-cutting section having a plurality of lower pre-cutting blades fastened mutually facing on the lower transversal heads, and a plurality of hollow retaining elements, to hold the fruits in position, and
  - a cutting section having, for each fruit holding flight, a plurality of pairs of separate cutting blades being fixed on the upper transversal head above the respective recess for laterally cutting the fruits.

This machine as well as a machine disclosed in PCT/IB2017/051016 of the same Applicant are designed for processing peaches. Their cutting section has a plurality of plungers in the form of rods, each plunger being movable between the separated cutting blades with respect to the upper head to hold the stone in place while finishing the cut, in order to release the stone from the pulp. In particular, their pre-cutting section does not comprise upper pre-cutting blades and is not adapted for processing avocado.

U.S. Pat. No. 2,924,259 A discloses a method comprising first orienting a fruit with reference to its peduncle-style axis, supporting the fruit at one end about this axis, effecting a cut in the fruit at both ends in alignment with said axis, and then ejecting the stone through the supported end and through the opening cut into the fruit by an impact effect applied to the stone, the impacting force being so great as to eject the stone through a small opening of the fruit without substantially tearing the fruit.

It should be understood that a method and a machine such as those described above for peach processing does not adapt to avocado processing. The main problem derives from the variable shape and size of the avocados, but also from the different adhesion to the pulp of the peach stone and of an avocado pit. The purpose of peach processing is to prevent stone fragments from sticking to peach halves after the fruit has been separated. Otherwise, in cutting avocados there is no risk that pit fragments are still attached to the pulp, but rather there remains the difficulty of separating the pulp from the pit due to the strong adhesion of the latter.

SUMMARY OF THE INVENTION

The present invention aims to solve this problem.

In particular, an object of the invention is to allow an avocado cutting operation that achieves the simultaneous detachment of the pit surface from the fruit pulp adhering to it for its subsequent easy removal from the fruit cut in two halves.

The main object in the cutting operation is to act on the fruit, leaving intact the pulp still protected by its epicarp.

Therefore, in a first aspect the present invention provides a method of fruit cutting according to the enclosed claims 1 and 2.

In a second aspect, the invention provides a multi-lane machine as stated in the enclosed claim 3 and in the claims depending thereon.

BRIEF DESCRIPTION OF DRAWINGS

Further features and advantages of the present invention will appear most clear from the indicative, and therefore non-limiting, description of an embodiment of a multi-lane machine for cutting avocados, as illustrated in the enclosed drawings in which:

FIG. 9 is a succession of schematic cross-section views showing an enlarged detail in FIG. 8 in successive moments of the operation of the cutting section.

DESCRIPTION OF EMBODIMENTS OF THE INVENTION

Figure 1:
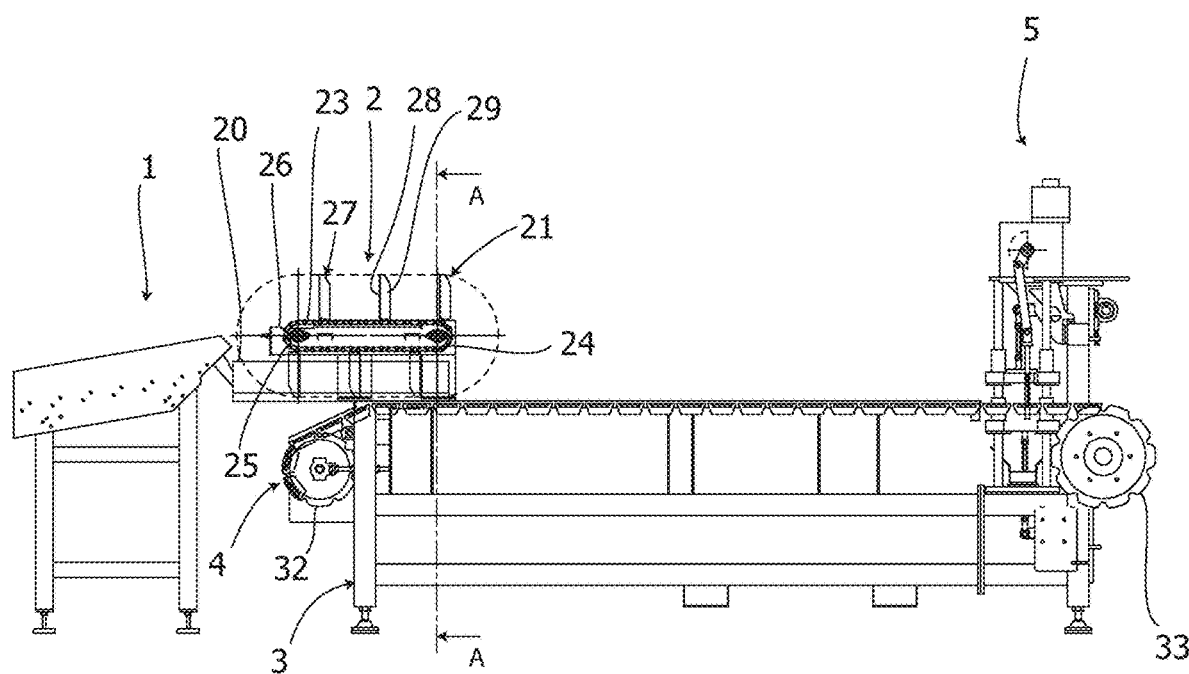
FIG. 1 is a partial schematic side view of a multi-lane machine for cutting avocados according to the present invention.

Reference is initially made to FIG. 1 which is a partial schematic side view of a multi-lane machine for cutting avocados according to the present invention. The multi-lane machine comprises a shuffle feeder 1, a scraper conveyor 2, a longitudinal frame 3, a conveyor 4, and a pre-cutting and cutting station 5.

Figure 2:
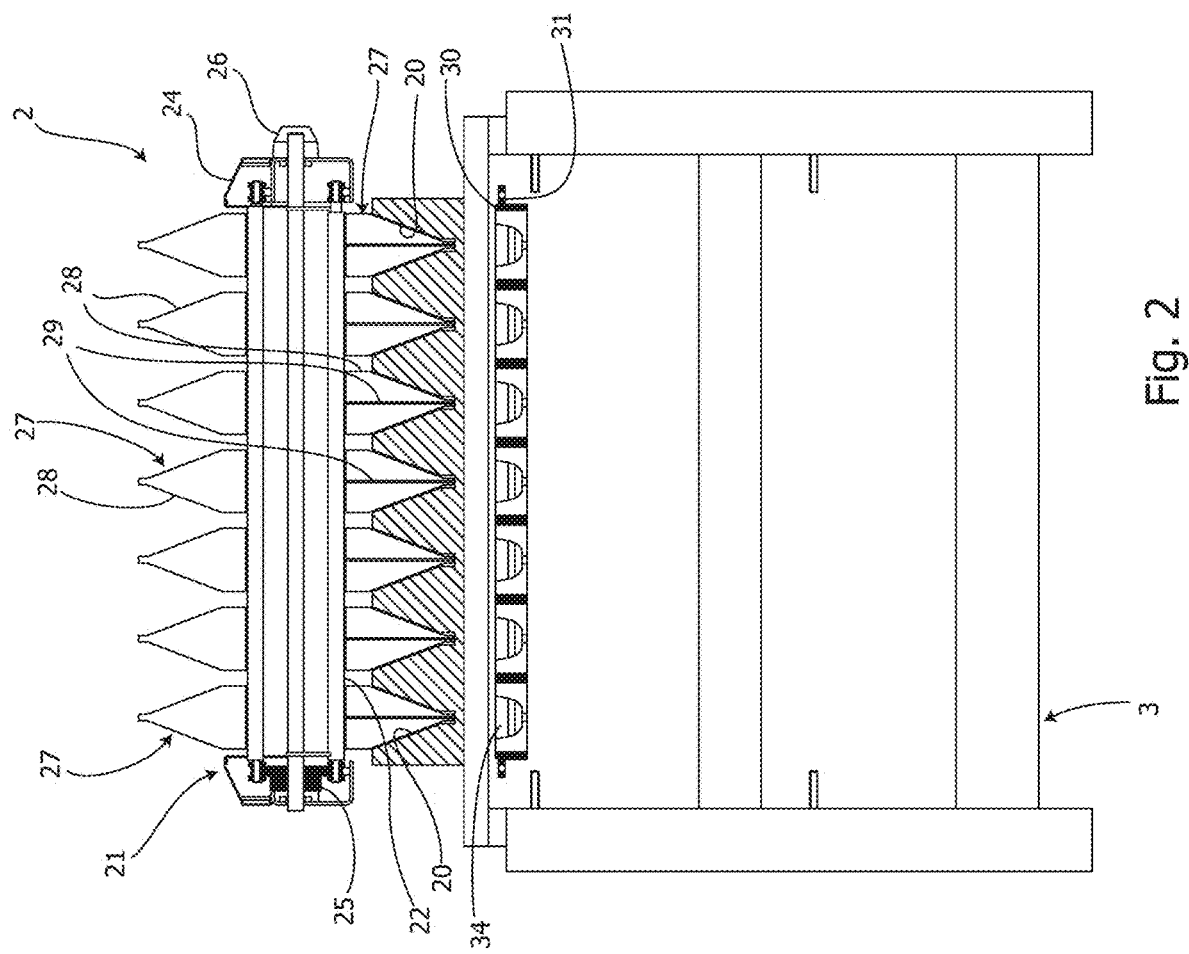
FIG. 2 is a cross-section view along the lines A-A in FIG. 1.
Figure 3:
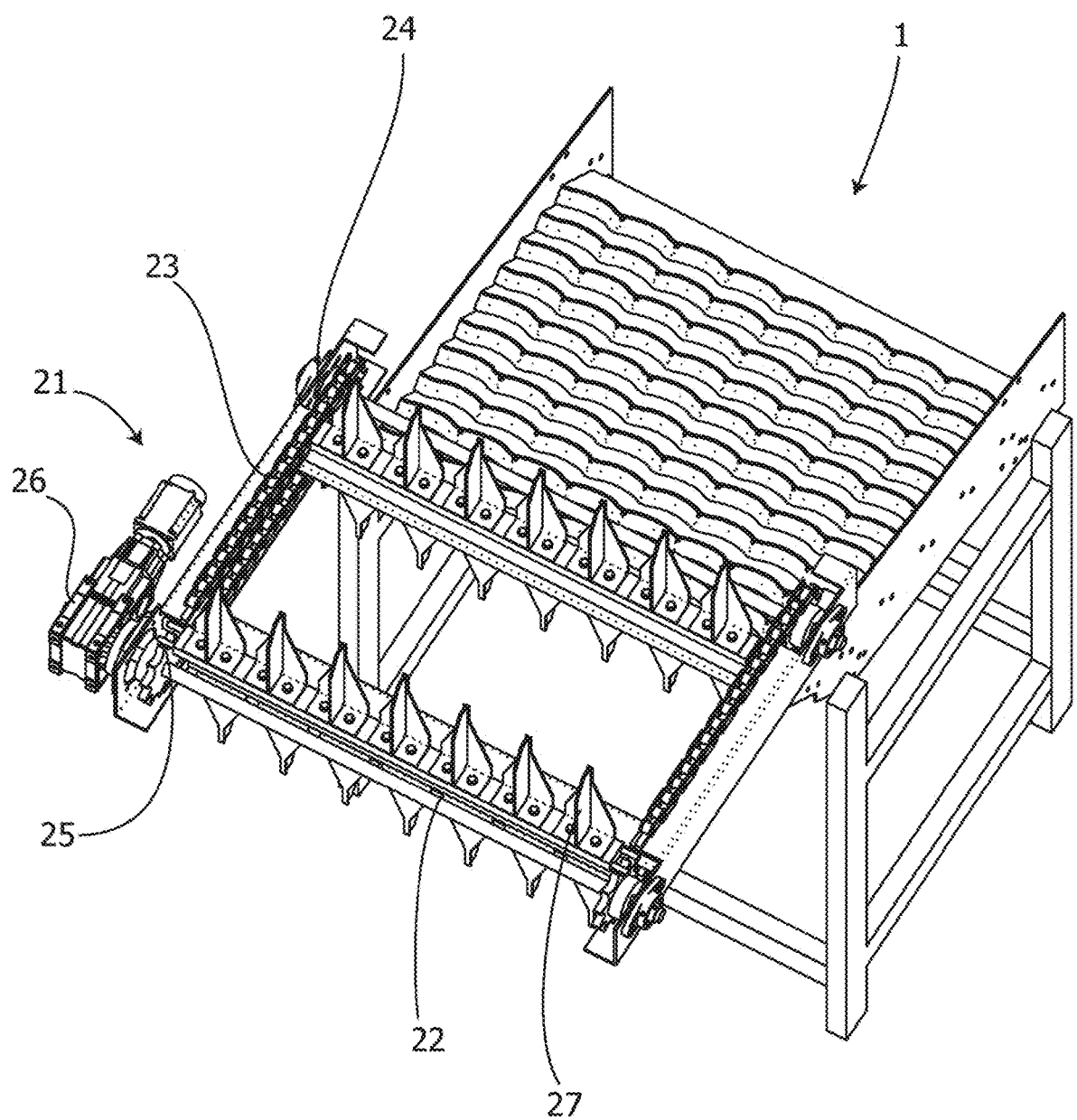
FIG. 3 is a perspective view from above of a shuffle feeder and a scraper conveyor of the machine in FIG. 1.

The shuffle feeder 1 and the scraper conveyor 2 are shown in greater detail in FIGS. 2 and 3 which are a cross-section view according to the lines A-A in FIG. 1, and a top perspective view of the shuffle feeder 1 and of the scraper conveyor 2.

The known-type shuffle feeder 1 has, as shown in FIG. 3, a conformation of the bearing surfaces adapted to the shape and size of the avocados.

Figure 4:
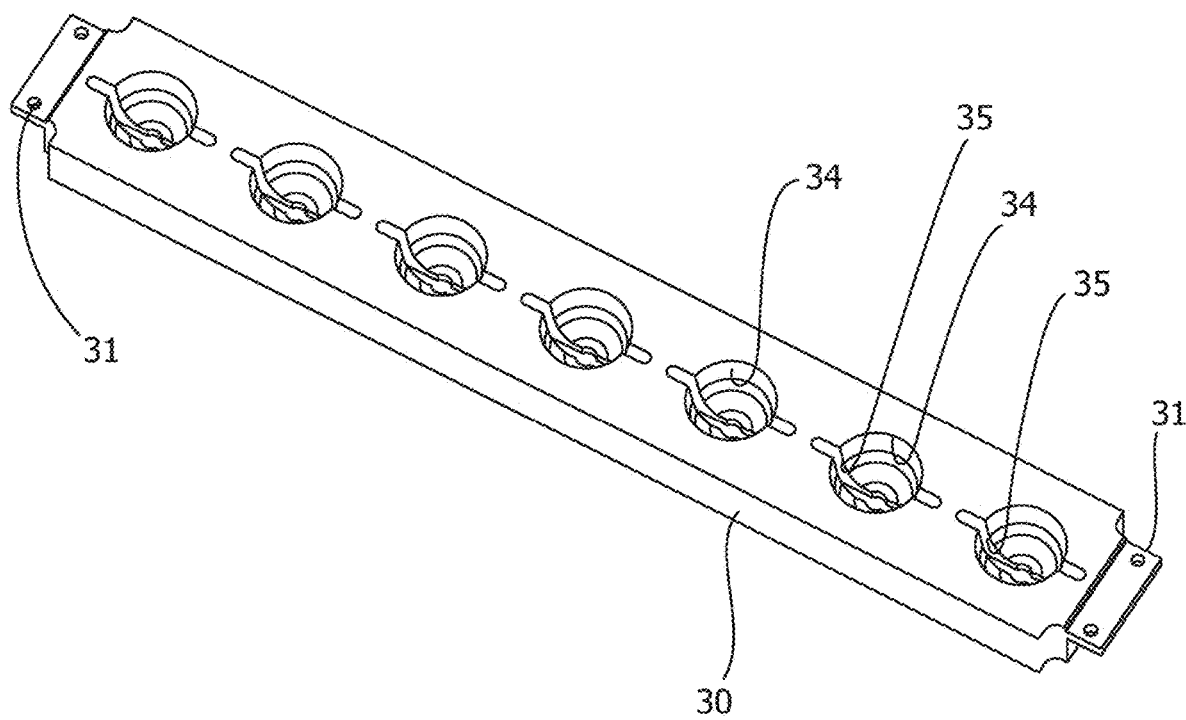
FIG. 4 is a perspective view of a flight of the conveyor of the machine in FIG. 1.

As shown in FIG. 2, the scraper conveyor 2 has a number of conduits, generally indicated as 20, equal to the number of lanes of advancement of the avocados in the machine. The conduits 20 of the scraper conveyor 2 are aligned with the advancing lanes of the avocados in the machine as shown by the fruit holding flights, indicated as 30. The fruit holding flights 30, like the one shown in perspective view in FIG. 4, are part of the conveyor 4 and are mounted on side chains, not shown in detail, by projections 31 for end connections. As is known, the side chains run on idle wheels 32 and on driving wheels 33 located at the end of the conveyor 4, that is near the shuffle feeder 1 on one side, and the pre-cutting and cutting station 5 on the other. The fruit holding flight has a series of recesses 34 in the same number of advancement lanes that are dimensioned according to the size of the avocados to be transported and spaced transversely; each recess 34 is provided at the bottom with an opening 35, which serves for the passage of the pre-cutting and cutting blades, as will be seen below.

As shown in FIGS. 1 and 2, the scraper conveyor 2 is surmounted by a thrust device 21 comprising a plurality of cross members 22 connected, at the ends, to a pair of chains 23 movable on idle pulleys 24 and driving pulleys 25 by means of a geared motor 26. Fixed to the crosspieces 22 are pushing elements, generally indicated as 27, hanging on the conduits 20. Each conduit 20 has a transverse section with a shape similar to that of an isosceles triangle with vertex pointing downwards; similarly, each pushing element 27 comprises a transverse wing 28 with a shape similar to that of an isosceles triangle, the base of which is fixed to the crosspiece 22, and a reinforcing fin 29, tapered at its end and fixed orthogonally to the transverse wing 28. The conformation of the conduits 20 is such that the avocados fed by the shuffle feeder 1 fall into the conduits 20 and are arranged with their big part upwards. The pushing elements 27, by sweeping the conduits 20, individually cause the avocados to fall into a recess 34 of the fruit holding flight 30 with their big part downwards. Both the conduits 20 and the pushing elements 27 can be dimensioned according to the sizes of the avocados to be processed.

Once an avocado is in the recess 34 of the conveyor 4, it is moved ahead by the conveyor 4 towards the pre-cutting and cutting station 5.

Figure 5:
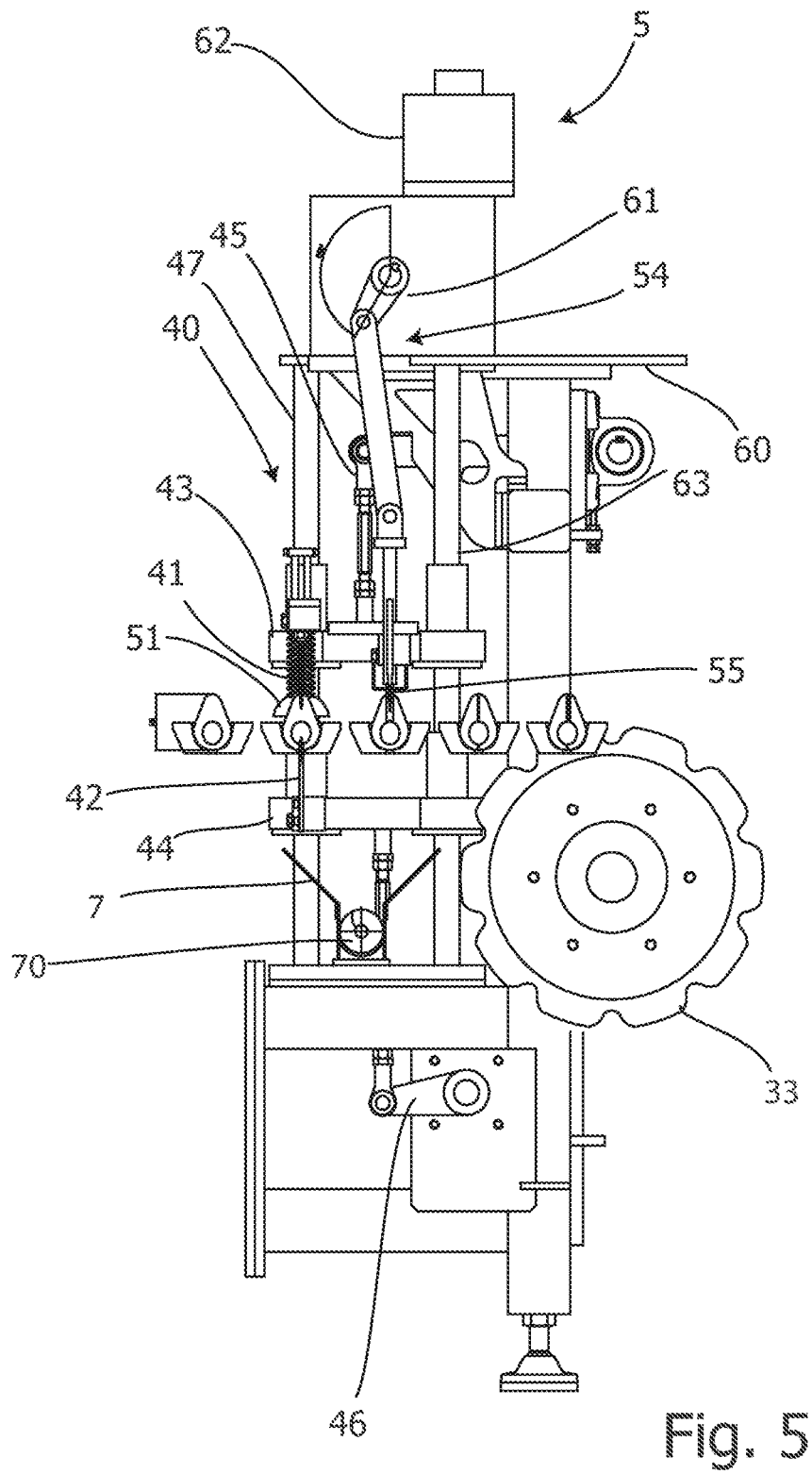
FIGS. 5 and 6 are enlarged partial side views of a pre-cutting and cutting station of the machine in FIG. 1 for two different sizes of avocados.
Figure 6:
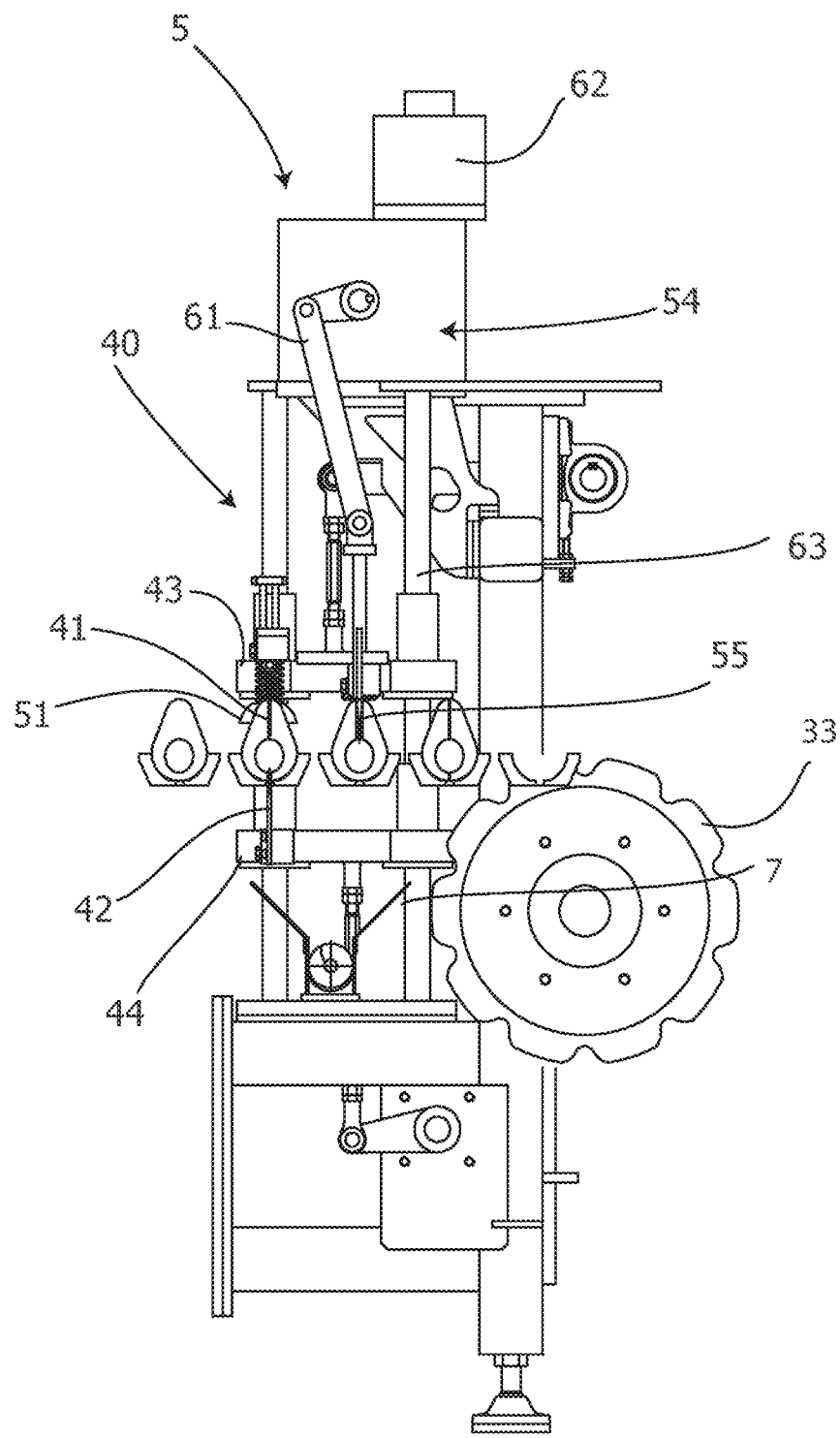
Figure 7:
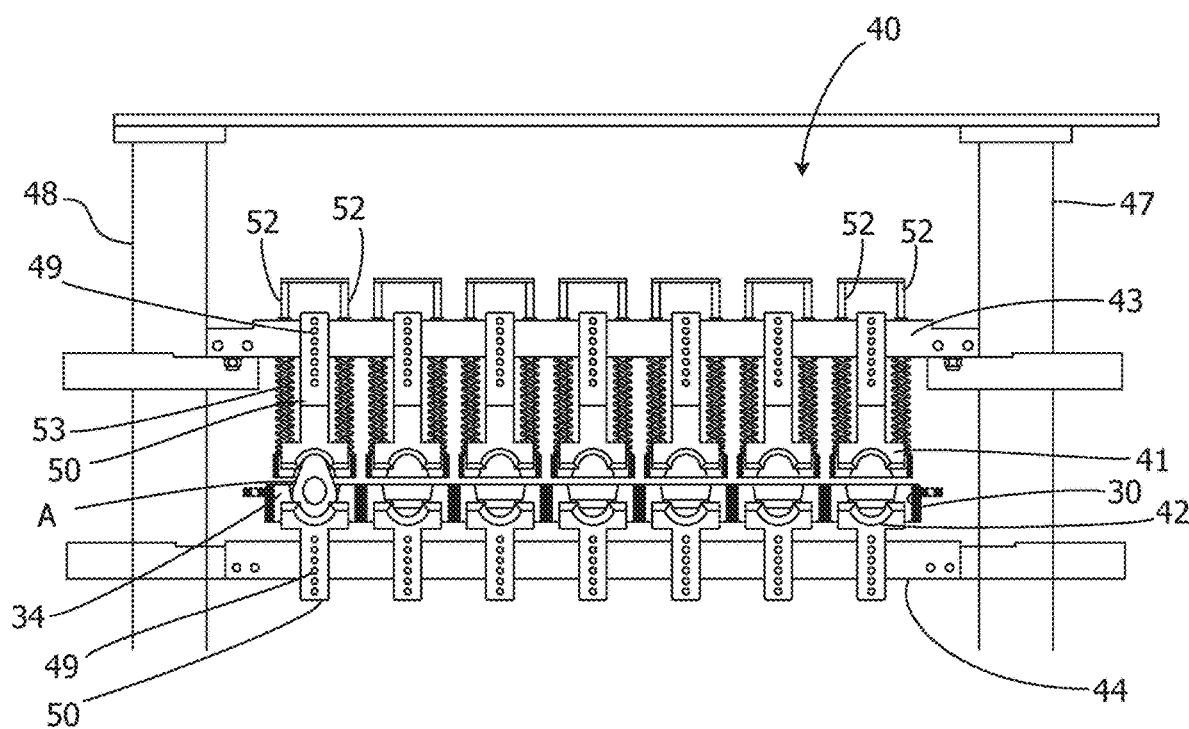
FIG. 7 is a further enlarged front view of the pre-cutting section in FIGS. 5 and 6.
Figure 8:
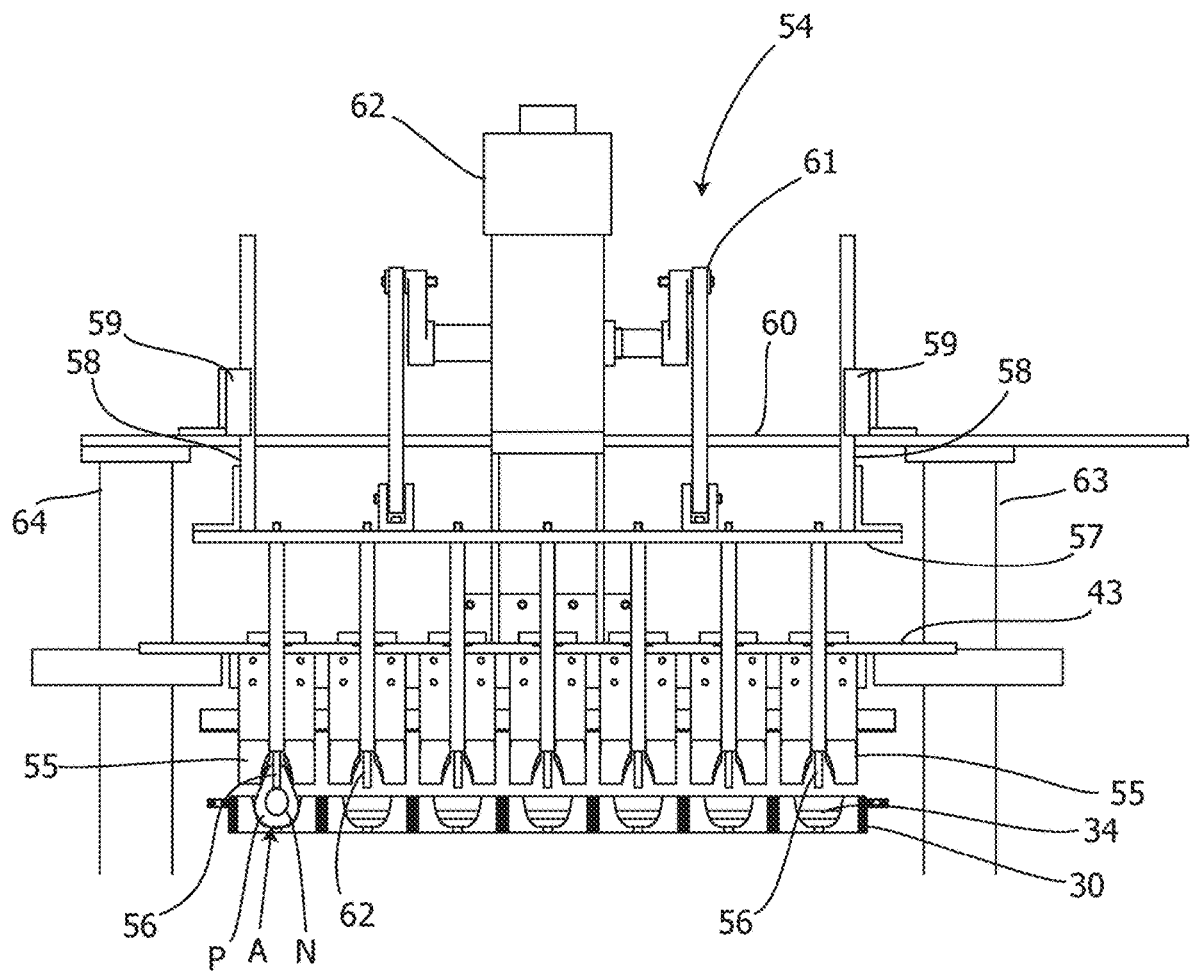
FIG. 8 is a further enlarged front view of the cutting section in FIGS. 5 and 6.

Reference is made now to FIGS. 5 and 6 which are enlarged side partial views of the pre-cutting and cutting station 5 for two different avocado sizes, and to FIGS. 7 and 8 which are a further enlarged front view of the pre-cut section and, respectively, of the cutting section in FIGS. 5 and 6.

The pre-cutting section, indicated generally as 40, has a plurality of upper pre-cutting blades 41 and lower pre-cutting blades 42 fixed, mutually facing, respectively to upper transverse head 43 and to lower transverse head 44. The upper transverse head 43 and lower transverse head 44 are movable in a known way by means of respective kinematic mechanisms 45, 46 along vertical guides 47, 48. The upper pre-cutting blades 41 and lower pre-cutting blades 42 can be fixed in an adjustable manner as shown by the holes 49 of their supports 50, as shown in FIG. 7. The position of the upper pre-cutting blades 41 and lower pre-cutting blades 42 is adjusted according to the size of the avocados A, as shown in FIGS. 5 and 6. The avocados are held in position during the pre-cutting by hollow retaining elements 51, which in FIGS. 5 and 6 are shown in the form of a spherical segment with open bases. The hollow retaining elements 51 to hold the avocados A in position, which are shown only partially in FIG. 7, are spring-loaded on a pair of vertical rods 52, 52 movable through the upper head 43, and are intended to rest, stressed by springs 53, on respective avocados A, vertically oriented along the axis peduncle-style in the recesses 34 of the fruit holding flights 30. The arrangement with springs described above is not to be meant as binding.

Shown in FIG. 8 is the cutting section 54 of the pre-cutting and cutting station 5. The cutting section 54 has a plurality of pairs of separate cutting blades 55 for each fruit holding flight 30. The separate cutting blades 55 are fixed on the upper transverse head 43 above the respective recess 34 for the lateral cutting of the avocados A. The upper transverse head 43 is movable on vertical guides 63, 64, operated as mentioned above by the kinematic mechanism 45.

Furthermore, according to the invention, the cutting section 5 has a plurality of plungers 56. Each plunger 56 is movable between the separate cutting blades 55 for each fruit holding flight 30 with respect to the upper head 43 to strike and move the pit N inside the avocado A in order to detach it from the pulp P.

The plurality of plungers 56 is mounted on a crosspiece 57 movable by uprights 58, 58 on vertical guides 59, 59 perpendicular to a fixed cross member 60 of the longitudinal frame 1. The crosspiece 57 is movable by means of a connecting rod-crank mechanism 61 operated by a brushless motor 62 mounted on said fixed cross member 60.

The connecting rod-crank mechanism 61 has an oscillating operation with a maximum crank angle dependent on the size of the avocados being processed. By way of example, the avocados treated in the pre-cutting and cutting station 5 in FIG. 5 are smaller than those cut in the pre-cutting and cutting station 5 in FIG. 6 and, therefore, the angle made by the crank is greater in the earlier than in the second one.

The consequent stroke of the plungers 56 is controlled by means of a programmable logic controller or PLC managing the brushless motor 62 which operates the connecting rod-crank mechanism 61. The adjustment of the plunger stroke is carried out by means of a touchscreen and therefore can be performed quickly in function of the size of the fruit, in particular its height, which generally corresponds to the position and size of the pit.

With reference to FIGS. 5 and 6, a hopper 7 having in its bottom an auger 70 is shown below the pre-cutting section 40 and the cutting section 54, in particular under the pre-cutting blades 41, 42 and the cutting blades 55. The hopper 7 with auger serves to receive the cutting residues of the avocados and to move them away from the pre-cutting and cutting station 5 for their recovery.

Reference will now be made to FIG. 9 which is a succession of schematic cross-section views showing an enlarged detail in FIG. 8 in successive moments of the operation of the cutting section. As stated above, the operation of the pairs of cutting blades 55 is performed by means of the kinematic mechanism 45 through cams (not shown) moved by the general operation of the machine, while the actuation of the plungers 56 is carried out by means of the separate connecting rod-crank mechanism 61 thanks to the brushless motor 62. In a phase indicated as 0 there is shown the starting position of the cut. In a phase indicated as 1 it is understood that the approaching of the plunger moved by the brushless motor and the simultaneous approaching of the cutting blades moved by the cams begins. In a phase 2 the penetration of plunger 56 and cutting blades 55 into the avocado begins. In a phase 3 the plunger 56 has come into contact with the pit N, while the cutting blades 55 advance. In the phase 4 a small axial displacement of the pit N is schematized due to its detachment from the pulp. The plunger 56 used the road opened by the pre-cutting of the upper blade 41, and its movement inside the avocado A in the N' position does not cause damage to the fruit which is not yet completely cut. In a phase 5 the cutting blades 55 arrived at the end of the stroke, the fruit is completely cut and the plunger 56 has risen upwards.

The cutting operation just described keeps intact the avocado pulp, still protected by its robust epicarp. However, the pulp is separated from the pit and the division into two parts of the avocado allows a subsequent easy detachment of the pit from them.

It should be understood that the intended object has been achieved by feeding, orienting, advancing, pre-cutting and vertical cutting in side parts of each avocado. At the same time as the vertical cut, the hit of the pit occurs which is struck to be slightly moved inside the avocado and detached from the pulp. The division in two halves of the avocado and the separation of the pit from the pulp is therefore easy. This is achieved by leaving intact the pulp, still protected by its epicarp.

The invention claimed is:

1. A method of cutting avocados, comprising
   feeding a plurality of avocados to a scraper conveyor,
   pushing the plurality of avocados in fruit holding flights downstream of the scraper conveyor with respect to a direction of travel, and arranged in a plurality of travel lanes,
   orienting each of the plurality of avocados having a longitudinal axis passing through a peduncle in the fruit holding flights, such that the avocado is oriented such that the longitudinal axis is perpendicular to the direction of travel and the peduncle is oriented upwardly with respect to the conveyor,
   moving the fruit holding flights toward a pre-cutting stage,
   cutting, in the pre-cutting stage, an incision in the upper and lower portions of each avocado, and
   cutting, in a cutting stage downstream from the pre-cutting stage by a plurality of cutting blades, a central vertical cut in each avocado through to the pit to divide the avocado into two halves,
   during the cutting stage, when the pit is hit by a respective cutting blade, displacing and detaching the pit from pulp in the avocado using a plunger, such that the pit is slightly displaced inside the avocado and detached from the pulp,
   wherein the step of orienting the avocado comprises:
   pushing each avocado into a conduit having a downwardly tapered cross-section, such that the avocado is arranged with the peduncle facing downward,
   sweeping each conduit thereby pushing each avocado from the conduit into a recess of a respective fruit holding flight in an inverted position in a respective lane to rest with the peduncle facing upwards.

* * * * *